United States Patent [19]

Jatnieks

[11] Patent Number: 4,695,782
[45] Date of Patent: Sep. 22, 1987

[54] SYSTEM FOR INSURING ROTATIONAL DIRECTION FOR AN ALTERNATING CURRENT MOTOR

[75] Inventor: Girts U. Jatnieks, Minneapolis, Minn.

[73] Assignee: Honeywell Inc., Minneapolis, Minn.

[21] Appl. No.: 904,995

[22] Filed: Sep. 8, 1986

[51] Int. Cl.⁴ .......................... H02P 3/20; H02P 1/40
[52] U.S. Cl. ..................... 318/748; 318/756; 318/280
[58] Field of Search ................. 318/746–749, 318/754, 756, 739, 740, 295, 663, 280, 281, 295, 663

[56] References Cited

U.S. PATENT DOCUMENTS

| | | | |
|---|---|---|---|
| 2,973,481 | 2/1961 | Frye | 328/196 |
| 3,068,388 | 12/1962 | Burski | 318/748 |
| 3,171,075 | 2/1965 | Kirk | 318/341 |
| 3,181,046 | 4/1965 | Sutton | 318/746 |
| 3,184,670 | 5/1965 | Reynolds | 318/300 |
| 3,416,054 | 12/1968 | Galles | 318/138 |
| 3,484,676 | 12/1969 | Wilkerson | 321/47 |
| 3,568,020 | 3/1971 | Lisi | 318/207 |
| 3,611,093 | 10/1971 | Walker | 318/258 |
| 3,619,747 | 11/1971 | Pedersen | 318/202 |
| 3,639,821 | 2/1972 | Byers et al. | 318/282 |
| 3,731,173 | 5/1973 | Pinckaers | 318/471 |
| 3,789,283 | 1/1974 | Kabat | 318/295 |
| 3,997,826 | 12/1976 | Mayer | 318/207 R |
| 4,045,682 | 8/1977 | Poorbaugh et al. | 307/127 |
| 4,112,343 | 9/1978 | Douglas | 318/674 |
| 4,146,826 | 3/1979 | Wojslawowicz | 318/297 |

Primary Examiner—David Smith, Jr.
Attorney, Agent, or Firm—Alfred N. Feldman

[57] ABSTRACT

A system for insuring the correct rotational direction of a permanent magnet, bi-directional alternating current motor. A sensor driven by the output of the motor provides a time varying voltage signal that is differentiated and detected. The signal is then applied to either agree with or override the output control signal from a conventional motor control circuit. When the system operates in the correct direction, the signal complements the motor control. When the device tries to operate in an incorrect direction, the signal overrides the motor control signal.

8 Claims, 2 Drawing Figures

SYSTEM FOR INSURING ROTATIONAL DIRECTION FOR AN ALTERNATING CURRENT MOTOR

BACKGROUND OF THE INVENTION

In the application of electric motors to operate various types of loads, it is not uncommon to match a load to equal very closely the starting torque of the motor. If the motor is of a permanent magnet, alternating current, synchronous bi-directional type, it has been found that the motor may start in a wrong direction under one or more of the following conditions:
 (a) Increase or decrease of the value of the phase shift capacitor.
 (b) Increase of the alternating current power voltage.
 (c) Change in the alternating current power frequency.
 (d) Increase of the load in the direction of the wrong rotation.

Whether the motor will start in the right or wrong direction is usually random with the probability of the wrong direction increasing with the severity of the above conditions. Starting in the wrong direction usually occurs upon a power turn "on", a change in direction, or after incountering an excessive load or an abrupt stall.

Application of permanent magnet bi-directional electric motors to drive loads, such as ventilating dampers, is quite common. It is desirable to use as small a motor as possible to drive the damper. As such, a particular damper will normally be matched with a motor that has just a sufficient operating torque to correctly operate the damper. Sometimes a damper will become wedged or loaded so that the motor can not easily operate the damper in the desired direction. When this occurs, the damper motor reverses its operation, thereby operating in the wrong direction. This type of operation can be very detrimental and normally motors have been oversized in order to avoid this problem. Oversizing of motors is a rather expensive expedient.

Some methods used to insure directional reliability have been to:
 (a) Reduce the tolerance of the alternating current phase shift capacitor (e.g. ±5%), which is expensive for an alternating current electrolytic capacitor.
 (b) Restrict the allowabble range of the power, voltage, and frequency, which severly limits the application of the motor.
 (c) Introduce a resistance in the coil or phase shift capacitor circuit, which reduces the efficiency of the motor.

Other solutions to this problem have been to provide mechanical no-back types of structures, or various types of lost motion arrangements. This involves retooling existing motors and can be rather expensive, even though the expedients used are very simple.

SUMMARY OF THE INVENTION

The present invention is particularly adapted to operate with and control a bi-directional, alternating current motor of the permanent magnet rotor type. These motors, being unreliable in their direction of rotation when loaded, must have some means to insure their proper directional stability.

The present invention utilizes a sensor means, in the form of a potentiometer, that is driven by the load which is controlled by the motor. The sensor means provides a signal that is indicative of the direction of rotation. This signal is then electronically processed and combined with the normal motor control output to insure that the motor functions in the correct direction.

In the event that the motor starts in the wrong direction, the present sensor system provides a voltage signal that momentarily disables the motor. The motor is then again called upon by the motor control circuit to begin operation. If the direction is correct, the sensor means and the output from that sensor means is in agreement with the motor control output and allows the motor to continue to operate. If the motor again has started incorrectly, it will be restarted. This process repeats itself until the sensor means varifies that the motor is operating in the correct direction.

In accordance with the present invention, there is a system for insuring the correct direction of rotation of a bi-directional, alternating current motor, including: permanent magnet rotor means for said motor; stator means having a pair of windings and a capacitor; said capacitor and said windings being connected in a delta connection configuration and having external connection means; motor control means connected to said connection means and to a source of alternating current potential to energize said motor to cause said rotor means to rotate in either a clockwise direction or a counterclockwise direction in response to said motor control means; said motor having rotational output means to drive load means; bridge means including sensor means driven with said load means and providing a time varying voltage signal from said bridge means; said sensor means limited in movement to correspond to the movement of said load means; differentiator means having an input means and an output means with said input means connected to said sensor means to differentiate said time varying voltage signal; said output means of said differentiator means providing a resultant signal; voltage level detector means having input means connected to receive said resultant signal; said voltage level detector means having two output signals in response to operation of said sensor means; and said voltage level detector means connected to said motor contol means to insure that said rotor means rotates in only the direction that said control means dictates by said two output signals from said differentiator means selectively acting with said motor control means.

DESCRIPTION OF THE PREFERRED EMBODIMENT

Figure 1:
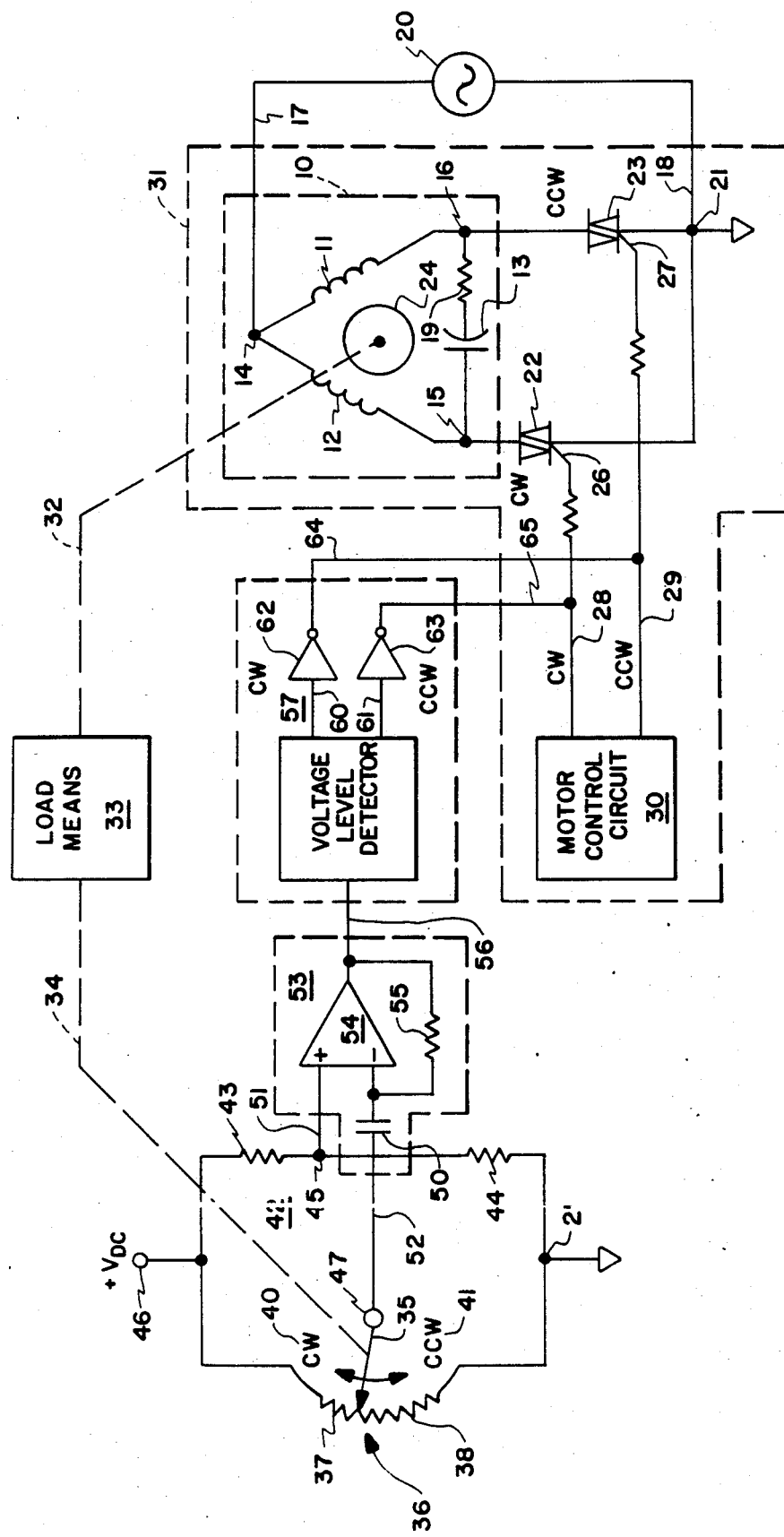
FIG. 1 is a schematic representation of the entire system.

The present system is particularly applicable to a bi-directional, alternating current motor as disclosed at 10. The motor 10 has a pair of windings 11 and 12 that are connected with a capacitor 13 in a delta configuration. A resistor 19 is often added in series with the capacitor to limit current discharge when both triacs inadvertently turn "on" simultaneously. The motor has three output means or terminals 14, 15, and 16. The terminals 14, 15, and 16 are used to energize the motor 10 by means of a conductor 17 and a conductor 18 from a source of alternating current potential 20. The conductor 18 is grounded at 21 and is connected to the terminals 15 and 16 by two triacs 22 and 23. The motor 10 is completed by having a permanent magnet rotor means 24.

Depending on which triac is energized, the motor will rotate either clockwise or counterclockwise. The triac 22 has been identified as a clockwise triac just as a matter of reference, while the triac 23 has been identified as a counterclockwise triac. The triacs 22 and 23 have appropriate gates 26 and 27 that are connected by circuitry including conductors 28 and 29 to a motor control circuit generally disclosed at 30. The motor control circuit 30 has an output signal on conductor 29 to cause the triac 23 to fire causing counterclockwise rotation. The motor control means 30 has an output signal on the conductor 28 to the triac 22 to cause counterclockwise rotation of the rotor 24.

To this point in the description, a generally conventional reversible motor drive circuit and motor means has been identified at 31. This type of motor has been used in the industry to drive loads such as dampers and valves. In the present discussion, a damper will be described as the load for the system since it is easiest understood.

The rotor 24 is connected by rotational output means 32 to a load means 33. The load means 33 can be any type of load, but as indicated previously can best be understood if it is considered as a damper, such as used in heating, air conditioning or ventilating installations. The rotational output means 32 further is extended at 34 to drive a wiper 35 on a sensing means generally disclosed at 36 as a potentiometer. The potentiometer or sensor means 36 has resistive portions 37 and 38 which lie on either side of the wiper 35. In this particular disclosure, the wiper 35 has been shown as having a motion either clockwise 40 or counterclockwise 41, and these references will be found handy in connection with the description of operation of the present system. The sensor 36 having resistive sections 37 and 38 are connected in a Wheatstone bridge configuration generally disclosed at 42, and including resistors 43 and 44. The resistors 43 and 44 are connected at a node 45. The bridge is completed by the application of a direct current potential between a terminal 46 and the ground 21. Since the terminal 46 and the ground 21 provide an input into the Wheatstone bridge 42, it is common to have an output between a terminal 47 and the node 45. In this case the terminal 47 is connected through a capacitor 50 in order to provide a rate of change of voltage with respect to time as the wiper 35 is moved when the rotor 24 rotates.

The output from the bridge 42 is by way of conductors 51 and 52 to a differentiator disclosed at 53. The differentiator is made up of an operational amplifier 54, a feedback resistor 55 and operates in conjunction with the capacitor 50. The differentiator 53 has an output on the conductor 56 that is connected to a voltage level detector 57. The voltage level detector 57 can be any type of electronic device that is capable of comparing voltages and which has two outputs using conductors 60 and 61. The output on conductor 60 is fed to an inverter 62, while the output on conductor 61 is fed to an inverter 63. The inverter 62 is connected by conductor 64 to the conductor 29, while the inverter 63 is connected by conductor 65 to the conductor 28.

OPERATION OF FIG. 1

The rotation of the rotational output means 32 is detected by the wiper 35 of the potentiometer or sensor means 36. This sensor means is mounted on the hub of the motor shaft for the motor 10, or at any other convenient location. The motion of the wiper 35 provides a time varying voltage signal at 47 that is differentiated by the differentiator 53 that consists of the operational amplifier 54, the capacitor 50, and the resistor 55. The resultant signal at the output of the differentiator 53 on the conductor 56 is lower than the voltage at node 45 for motion in the clockwise direction. The output at 56 is higher than the node voltage 45 for motion of the wiper 35 in the counterclockwise direction.

The level of the voltage on conductor 56 is then detected by the voltage level detector means 57. The voltage level detector means 57 has an output that is high at the conductor 60 for a clockwise motion, and which is high at the conductor 61 for a counterclockwise motion. When there is no motion of the wiper 35 indicating that the rotor 24 is stationary, the voltage at the node 45 is equal to the voltage on conductor 56 and both outputs on the conductors 60 and 61 are low.

The voltage levels of the voltage on conductors 60 and 61 are then inverted by the inverters 62 and 63 and applied by the conductors 64 and 65 to the conductors 28 and 29 of the reversible drive motor means 31. These connections are made with the clockwise sense signal going to the counterclockwise output conductor 29. The counterclockwise sense signal goes to the clockwise output conductor 28. Thus, during a clockwise motion of the output shaft or rotational output means 32 and the wiper 35, a low signal is applied from conductor 64 at conductor 29 disabling the drive from the motor control circuit 30 in the counterclockwise direction. If the desired motor drive is in a clockwise direction, the desired control signal at the conductor 29 is already low and nothing is changed from the normal motor operation. However, if the desired drive was in the counterclockwise direction, the signal applied at the conductor 29 from the motor control circuit 30 would be high driving the conductor 29 high thereby causing the counterclockwise triac 23 to conduct. However, since the actual motion was in the clockwise direction (which is the wrong direction), a new low voltage level is applied at conductor 29 overriding the high signal from control circuit 30, and it will disable the motor drive and stop the motor. The disabling signal will then be removed by conductor 64 from the conductor 29, and the counterclockwise triac 23 will have another chance at driving the motor 10 in the desired direction. The motor 10 will then most likely drive in the desired direction. However, if the new drive is still in the wrong direction, the drive will again be stopped and repeatedly started until the motor 10 finally drives in the desired direction.

A similar sequence of events, but of opposite direction, will occur when the motor is to be operated in the reverse direction. Effectively, the motion sensing means 36 provides a signal from the wiper 35 to the system disabling the signal provided from the motor control circuit 30 if the motor 10 starts in the wrong direction. The motor can try and restart as many times as is necessary to accomplish the correct directional rotation. Each time the motor stops, the wiper output is blocked by the capacitor 50. The only signal that the system senses is a rate of change of voltage with respect to time.

Figure 2:
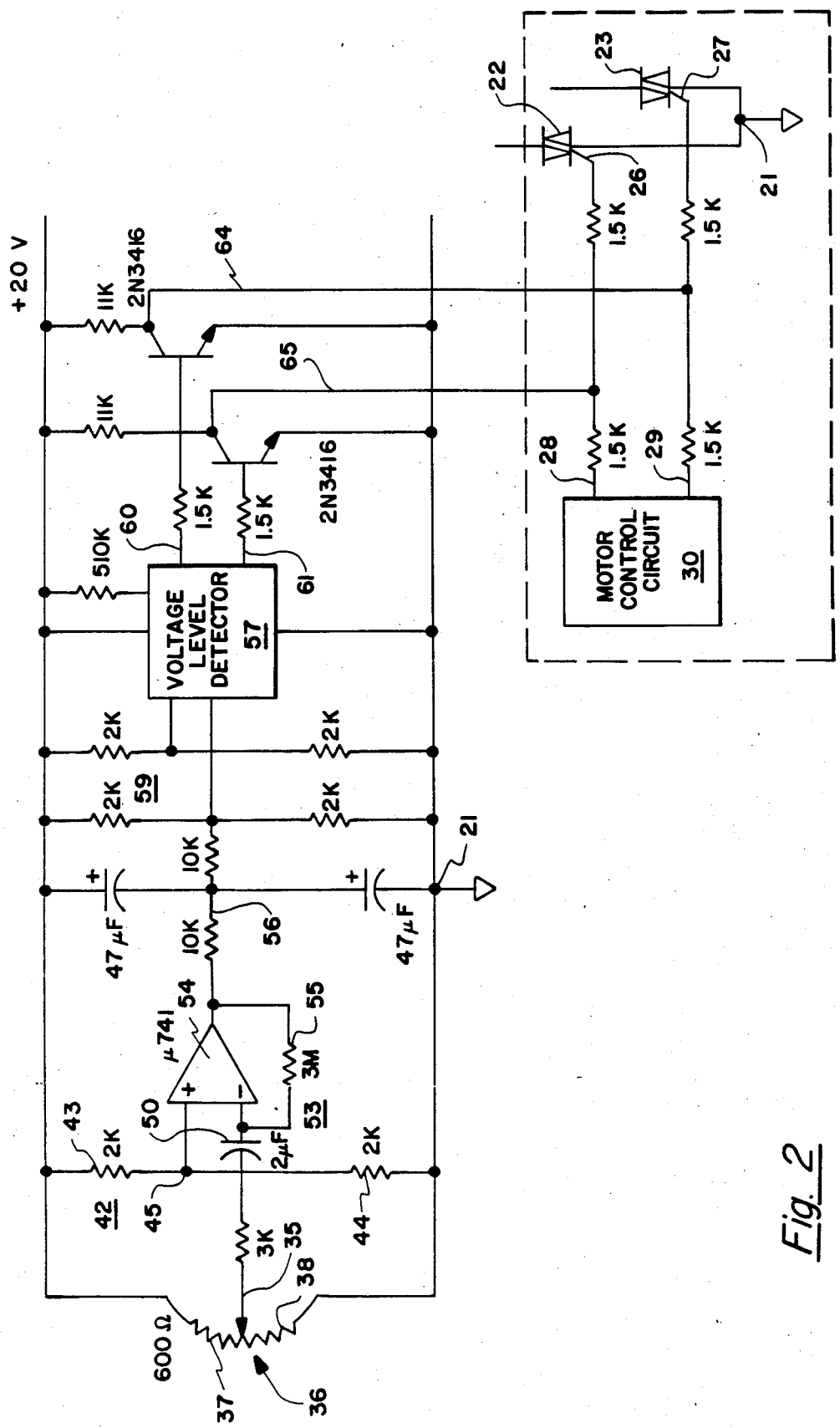
FIG. 2 is a detailed schematic of part of the present invention applied to a motor.

In FIG. 2 there is disclosed in detail the actual electronics of a system that operates in the mode of the present invention. All the similar parts will be marked with similar reference numbers, and the numerical or component values of the electronic components have been noted. Once again the sensor means 36 having the wiper 35 is provided in the Wheatstone bridge 42 which includes the resistors 37, 38, 43, and 44. The node 45 is disclosed along with the capacitor 50 which operates with the operational amplifier 54 and the resistor 55 as a differentiator 53.

The output 56 from the differentiator 53 is fed through the necessary biasing or voltage supply circuits 59 for a voltage level detector 57. The voltage level detector has outputs on conductors 65 and 64 to the conductors 28 and 29 which emanate from the motor control circuit 30. Once again the triac 22 for the clockwise drive direction is disclosed, along with the triac 23 that operates a motor (not shown in this Figure) in the counterclockwise direction.

The present motor control system can be implemented in a number of different ways and a very simple straightforward electronic implementation using a potentiometer 36 and its wiper 35 have been illustrated. Since many variations in the type of sensor, electronics, and other portions of the invention can be implemented by one skilled in the art, the inventor wishes to be limited in the scope of his invention solely by the scope of the appended claims.

The embodiments of the invention in which an exclusive property or right is claimed are defined as follows:

1. A system for insuring the correct direction of rotation of a bi-directional, alternating current motor, including: permanent magnet rotor means for said motor; stator means having a pair of windings and a capacitor; said capacitor and said windings being connected in a delta connection configuration and having external connection means; motor control means connected to said connection means and to a source of alternating current potential to energize said motor to cause said rotor means to rotate in either a clockwise direction or a counterclockwise direction in response to said motor control means; said motor having rotational output means to drive load means; bridge means including sensor means driven with said load means and providing a time varying voltage signal from said bridge means; said sensor means limited in movement to correspond to the movement of said load means; differentiator means having an input means and an output means with said input means connected to said sensor means to differentiate said time varying voltage signal; said output means of said differentiator means providing a resultant signal; voltage level detector means having input means connected to receive said resultant signal; said voltage level detector means having two output signals in response to operation of said sensor means; and said voltage level detector means connected to said motor control means to insure that said rotor means rotates in only the direction that said control means dictates by said two output signals from said differentiator means selectively acting with said motor control means.

2. A system for insuring the correct direction of rotation of a bi-directional, alternating current motor as claimed in claim 1 wherein said sensor means is variable impedance means.

3. A system for insuring the correct direction of rotation of a bi-directional, alternating current motor as claimed in claim 2 wherein said variable impedance means is a potentiometer.

4. A system for insuring the correct direction of rotation of a bi-directional, alternating current motor as claimed in claim 3 wherein said potentiometer is a rotational type of potentiometer and said limitation in movement is a limitation to less than 360 degress of rotation.

5. A system for insuring the correct direction of rotation of a bi-directional, alternating current motor as claimed in claim 4 wherein said bridge means is a Wheatstone type of bridge including direct current energizing means, and having a capacitor for coupling said time varying signal voltage output.

6. A system for insuring the correct direction of rotation of a bi-directional, alternating current motor as claimed in claim 5 wherein said motor control means includes a pair of solid state switch means with each of said switch means connected to said delta connection configuration of said motor means to selectively control the energization of said motor means.

7. A system for insuring the correct direction of rotation of a bi-directional, alternating current motor as claimed in claim 6 wherein said motor control means includes a pair of control output circuits with each of said circuits connected to a separate one of said solid state switch means.

8. A system for insuring the correct direction of rotation of a bi-directional, alternating current motor as claimed in claim 7 wherein said solid state switch means are triacs.

* * * * *